United States Patent
Willins et al.

(10) Patent No.: US 7,110,799 B1
(45) Date of Patent: Sep. 19, 2006

(54) MOBILE TERMINAL FOR INTEROPERATING WITH A STANDARD OR PUSH-BUTTON ENABLED HEADSET

(75) Inventors: Bruce A. Willins, East Northport, NY (US); Askold Strat, Sound Beach, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 468 days.

(21) Appl. No.: 10/172,334

(22) Filed: Jun. 14, 2002

(51) Int. Cl.
 *H04M 1/00* (2006.01)
(52) U.S. Cl. .................. 455/575.2; 455/575.1; 455/569.1; 379/430; 379/433.03
(58) Field of Classification Search ............ 455/575.1, 455/575.2, 569.1, 569.2, 557, 426.1, 463, 455/465, 66.1, 74; 379/430, 433.03
See application file for complete search history.

(56) References Cited

U.S. PATENT DOCUMENTS

| | | | |
|---|---|---|---|
| 5,978,689 A * | 11/1999 | Tuoriniemi et al. ...... | 455/569.1 |
| 6,272,361 B1 * | 8/2001 | Courtis et al. ........... | 455/569.1 |
| 6,292,560 B1 | 9/2001 | Gligoric ..................... | 379/421 |
| 6,459,882 B1 * | 10/2002 | Palermo et al. ............ | 455/41.1 |
| 6,594,366 B1 * | 7/2003 | Adams ........................ | 381/74 |
| 6,597,786 B1 * | 7/2003 | Lin ........................ | 379/388.02 |
| 6,856,046 B1 * | 2/2005 | Scarlett et al. .............. | 307/125 |
| 6,871,047 B1 * | 3/2005 | Iwata ........................ | 455/41.2 |
| 2002/0037746 A1 * | 3/2002 | Osano ........................ | 455/557 |
| 2002/0068600 A1 * | 6/2002 | Chihara et al. ............. | 455/550 |
| 2002/0133545 A1 * | 9/2002 | Fano et al. ................. | 709/203 |
| 2003/0060242 A1 * | 3/2003 | Dotzler ....................... | 455/569 |

\* cited by examiner

*Primary Examiner*—Matthew D. Anderson
*Assistant Examiner*—Sanh Phu
(74) *Attorney, Agent, or Firm*—Amin & Turocy, LLP

(57) ABSTRACT

The present invention relates to a mobile terminal that can interoperate with a plurality of headsets. The present invention further relates to systems and methodologies for facilitating communication to the mobile terminal from the plurality of headsets. The plurality of headsets can be of various types. For example, the headset can be a push button enabled signaling headset, which includes a signaling mechanism, such as a button, mounted to the headset or a headset cord. The mobile terminal includes a sensing component to detect the signaling from the headset. The signaling mechanism is employed to issue commands to the mobile terminal. Alternatively, the headset can be a standard, commercially available audio headset. If the standard headset is employed, the signaling function is not available and the standard headset operation is not impacted.

25 Claims, 8 Drawing Sheets

MOBILE TERMINAL FOR INTEROPERATING WITH A STANDARD OR PUSH-BUTTON ENABLED HEADSET

TECHNICAL FIELD

The present invention relates generally to portable electronic devices and/or communication systems, and more particularly to a system and method to facilitate communication from a headset to a portable electronic device in mobile applications.

BACKGROUND OF THE INVENTION

The control of electronic devices has traditionally required the manual operation of dials, buttons, keyboards, keypads, and the like. However, such manual operation can be impractical, awkward, and inconvenient. For example, the terminal can be hooked to a belt underneath layers of clothing or a user might be wearing gloves, in which access to mechanical interfaces on the terminal is difficult and/or time consuming. Additionally, as technology progresses, manufacturers of electronic devices are continually reducing size of the devices, and thus, also reducing size of keyboards, keypads, or other mechanical interfaces. Such size reduction further hampers the ability of users to input accurate information.

Speech recognition technology has been developed for use in electronic devices in response to the aforementioned problems. In general, conventional speech recognition technology comprises a mechanism for receiving an input voice signal, comparing the input voice signal with stored voice signals, and determining if the input voice signal is sufficiently similar to any of the stored voice signals. If there is a match between the input and stored voice signals, instructions or other data is generated by the device.

However, a disadvantage with speech recognition is the need to "train" the speech recognition system to understand a specific vocabulary, language characteristics, and characteristics of the voice of the speaking person. The complexity increases with the size of the vocabulary that has to be recognized in any particular instance of the dialog with the application. Further, whether using speech recognition for command and control, having a telephone conversation, or performing dictation, there are instances in which speech commands are inadequate. For example, if a user is wearing a terminal and a speech recognition engine and decides to take a break, to maintain battery life, the system should suspend as many operations as possible. Yet, if the speech recognition system is suspended, which requires a significant amount of processing and power, the user has no method by which to re-activate the recognition, other than to remove the terminal from his belt and press buttons and/or keys.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a mobile terminal that can interoperate with a plurality of types of headsets. For example, the mobile terminal can interoperate with a push-button enabled headset or a standard, commercially available headset. With respect to a push-button enabled type of headset, the mobile terminal includes a sensing component for detecting signaling provided by the headset.

The present invention further relates to a system and methodology for facilitating communication to a portable electronic device, such as a mobile terminal, from a headset. For example, the headset can be a push-button (e.g., momentary switch) enabled headset, which includes a signaling mechanism, such as button (e.g., momentary switch), mounted to the headset or a headset cord. The mobile terminal includes a sensing component to detect signaling from the headset. The headset signaling mechanism is employed to issue commands to the mobile terminal. Alternatively, the headset can be a standard, commercially available audio headset. If the standard headset is employed, the signaling function is not available and the standard headset operation is not impacted.

The following description and the annexed drawings set forth in detail certain illustrative aspects of the invention. These aspects are indicative, however, of but a few of the various ways in which the principles of the invention may be employed, and the present invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
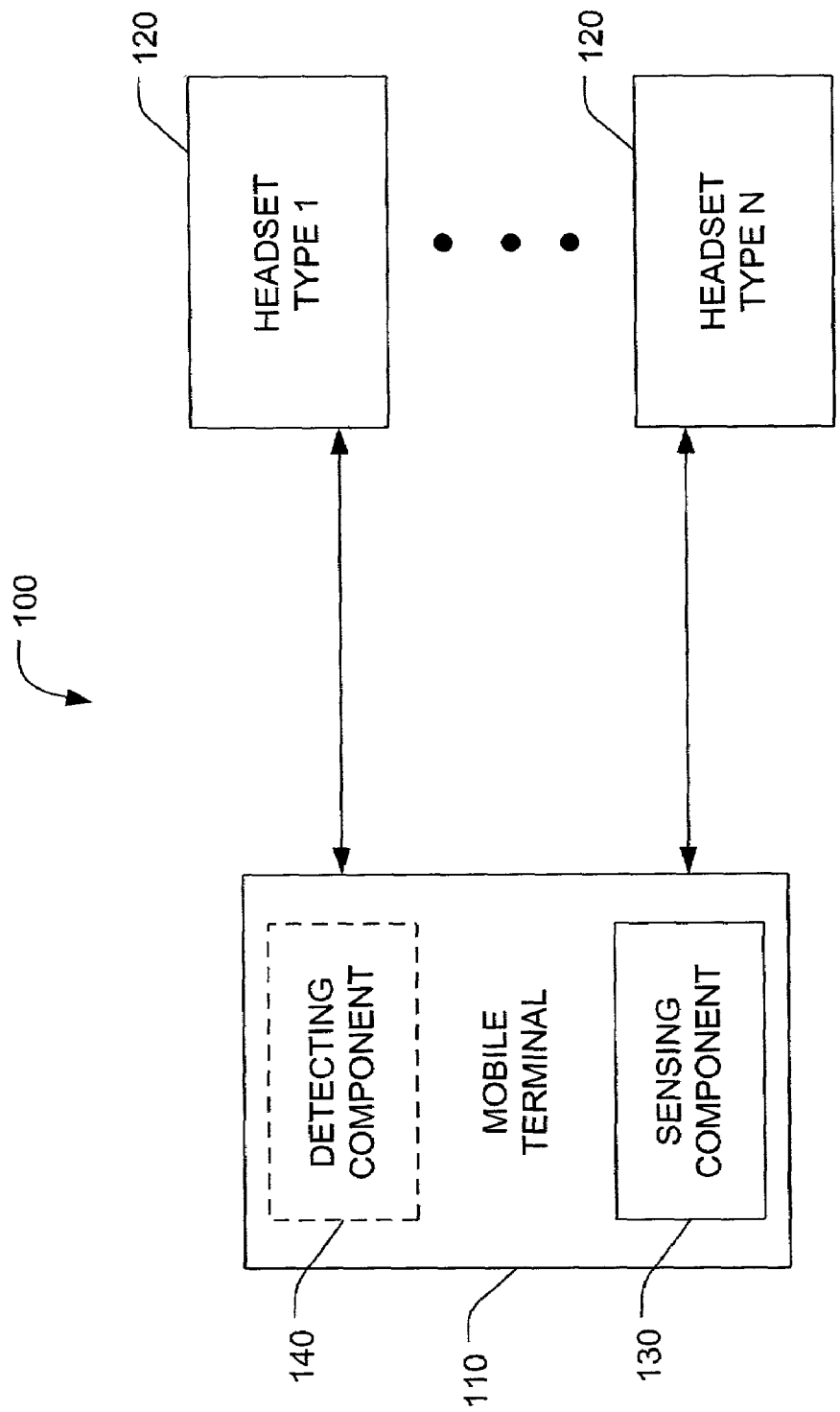
FIG. 1 is a schematic block diagram illustrating a mobile terminal and a plurality of headsets in accordance with an aspect of the present invention.

The present invention relates to systems and methods for a mobile terminal which can operate with a plurality of types of headsets. The present invention will now be described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block form in order to facilitate describing the present invention.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, both an application running on a server and the server can be a component.

Referring to FIG. 1, a system 100 for facilitating communication between a portable electronic device 110 and a plurality of headsets 120 is illustrated in accordance with an aspect of the present invention. The portable electronic device 110 in this example is a hand-held mobile terminal used in a wireless communication network. However, it is to be appreciated that the mobile terminal can be a cellular telephone, a Personal Digital Assistant (PDA), or any other mobile computing/communications device that can be similarly employed. The mobile terminal 110 can operate with one of a plurality of headsets 120. The plurality of headsets 120 can be of one or more different types, type 1 through type N (N being an integer). For example, one type of headset can be a commercially available audio headset and another type of headset can be a push-button enabled headset, which includes a signaling mechanism to communicate with the mobile terminal 110.

The mobile terminal 110 can include a sensing component 130 for detecting signaling from a push-button enabled headset. Thus, the sensing component 130 is activated if a push-button enabled type headset is employed with the mobile terminal 110. However, if a standard, commercially available type headset is employed, the sensing component 130 cannot be activated since a push-button is not present. Thus, operation of the standard headset is not impacted. The mobile terminal 110 can optionally include a detecting component 140 for indicating whether a headset is connected to the terminal 110.

Figure 2:
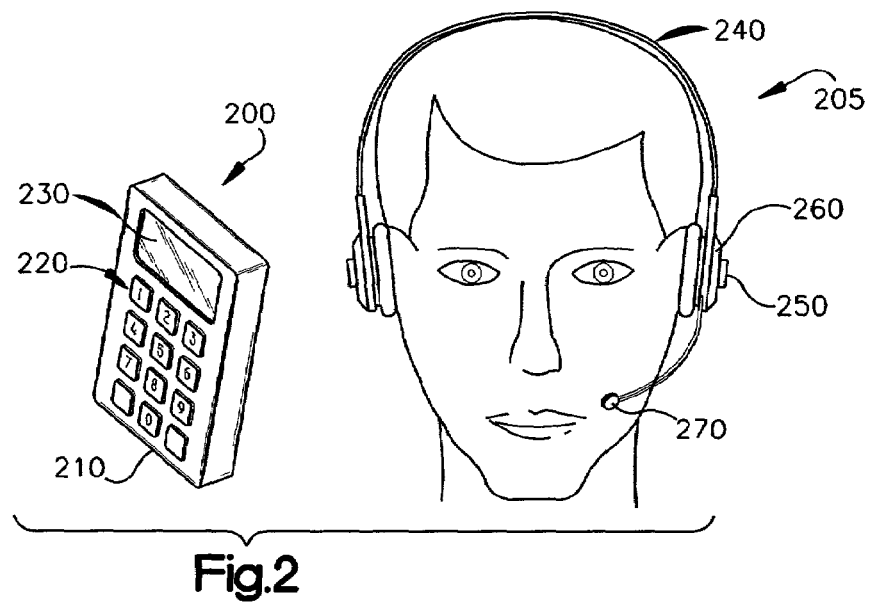
FIG. 2 is a perspective view of a mobile terminal and push-button enabled headset in accordance with an aspect of the present invention.

FIG. 2 depicts a system for facilitating communication between a mobile terminal 200 and a push-button enabled headset 205. The mobile terminal includes a housing 210, a set of user interface keys 220 for allowing a user to input information and/or operational commands and a display or touch screen 230 for displaying information and allowing the user to input information and/or operational commands. The mobile terminal can also include a bar code reader (not shown) adapted to read information on a bar code label or the like. The user interface keys 220 may include a full alphanumeric keypad, function keys, enter keys, etc. The mobile terminal 200 further includes a sensing component (not shown) for facilitating communication with the push button enabled headset 205. The sensing component can include active circuitry which uses switch activation to detect signaling from the push-button enabled headset 205, which will be explained in further detail below.

Moreover, the mobile terminal 200 can communicate with a standard headset over commercially available headset signaling. The terminal 200 includes a headset receptacle jack (not shown) which can accept a plurality of different types of headsets, such as a standard, commercially available headset or a headset having a signaling button, such as push-button enabled headset 205. If the standard headset is employed, the signaling function is not available and the standard headset operation is not impacted. The mobile terminal 200 can also include a headset detector component (not shown) for indicating whether a headset is connected to the terminal 200.

The headset 205 includes a support 240 for mounting on a user's head. The headset 205 also includes a button 250 mounted to an ear piece 260. The button 250 is employed to provide signaling to facilitate communication between the terminal 200 and the headset 205. It is to be appreciated that the button 250 is one type of a plurality of types of switches that can be employed and can be mounted anywhere on the headset 205 or a headset cord (not shown). Further, the button 250 could be located at a headset interface box (not shown) between the headset 205 and the mobile terminal 200. Regardless of the location of the button 250, employing such a button 250 relieves the user from having to reach to the mobile terminal 200 to issue commands.

Activation of the button 250 can issue simple commands to the terminal 200, such as power-up, power-down, pick-up an incoming call, hang-up, push-to-talk, etc. Moreover, interpretation of the button 250 can be context sensitive. For example, if a phone call is incoming (e.g., ringing), activation of the button can be interpreted as a means to pick up the call. As another example, if a phone conversation is in progress, activation can be interpreted as to hang up the call. In addition, more complex on/off signaling schemes can be used for higher level commands (e.g., switch activation duration, periodic pulses). Though it is possible, for example, to issue voice commands to hang up during a telephony conversation, very accurate word spotting speech recognition is required and is prone to false triggers, thereby erroneously disconnecting the session.

High level commands can be issued by employing complex on/off signaling schemes, such as switch activation duration and periodic pulses. For example, in a switch activation scheme, a user can issue a command with sequences of button presses of various durations. There can be two switch activation durations used—a short and a long. A short press can be defined as lasting less than ⅓ of a second while a long press can be defined as being anything greater than ⅓ of a second. The switches are debounced so that multiple closures due to bouncing will not be interpreted as multiple short activations. Also, a sequence, such as a double short down, for example, must have each symbol in the sequence follow the previous symbol by no more than ⅕ second, or any other time period defined by the system. Furthermore, the button can also be a smart button, in which the action taken is inferred by the context of the system. Thus, the button 250 is designed to provide a "context sensitive" control in which various switch combinations achieve different results. The context sensitive concept refers to the application (program) or event that is running on the terminal at a given moment. For instance, if the terminal is in telephone mode and it rings, a button push is interpreted as picking up the phone. After a few seconds of conversation a button press can signify "hang up the phone". In normal operation, a portable terminal "goes to sleep" to conserve batteries if it is not used for a predefined time interval. In this case pushing the button can be the "wake up" or "on" command. Additionally, the interpretation of the button or switch can also be based on past, or historical, actions of the user.

The headset 205 also includes a microphone 270 such that the user can provide voice commands to the terminal 200, or alternatively, communicate with another user or remote system. The microphone 270 can be an electret microphone or any other suitable microphone. This invention takes advantage of the fact an electret microphone requires a bias voltage to operate. The signaling consists in generating a short across the microphone, therefore bringing the bias voltage near ground level. A level change is sensed by a circuit in the terminal and interpreted as a command. The electret microphone is generally sensitive, durable, and compact in size with low power requirements. The electret is a modified version of the classic capacitor (or condenser) microphone, which exploits changes in capacitance due to mechanical vibrations to produce voltage variations proportional to sound waves. Whereas the condenser microphone needs an applied (phantom) voltage, the electret has a built in charge, and the few volts needed are to power a built-in FET buffer, not to create an electric field.

Figure 3:
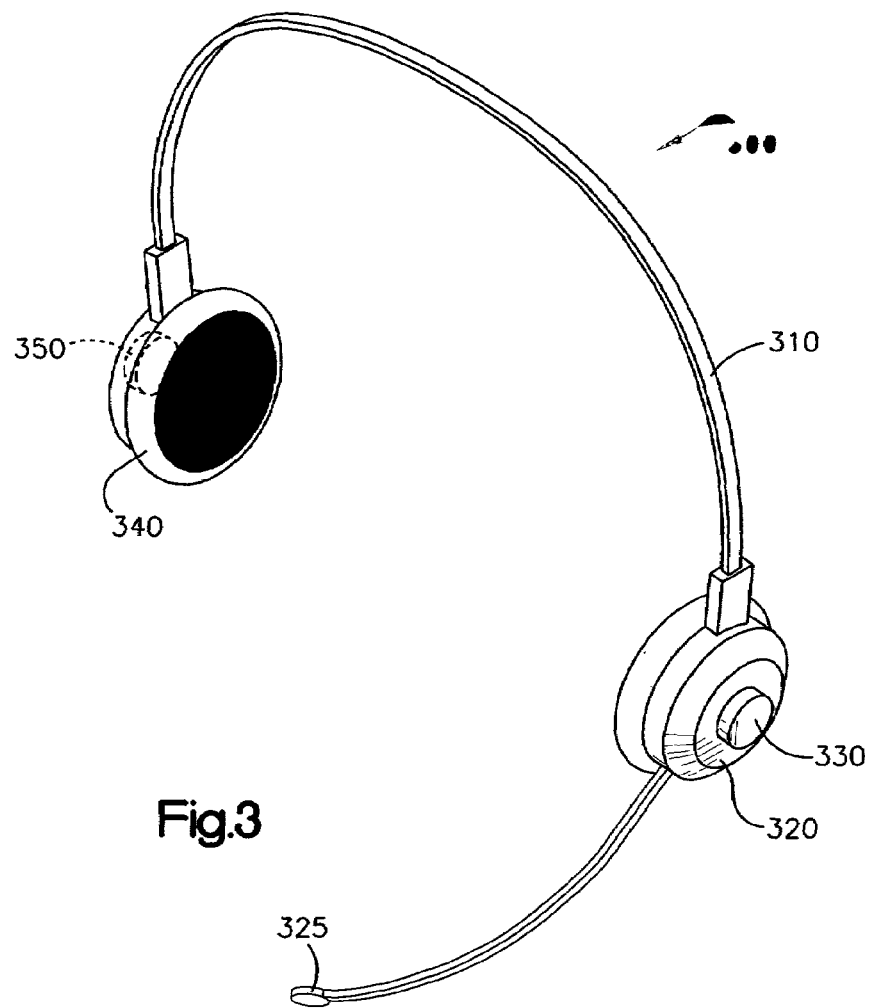
FIG. 3 is a perspective view of a push-button enabled headset in accordance with an aspect of the present invention.

Turning now to FIG. 3, a push-button enabled headset 300 is illustrated in accordance with an aspect of the present invention. The headset 300 comprises a support 310 for mounting on a user's head. At least one ear piece 320 for receiving audio is mounted on the support 310. The ear piece 320 includes a button 330 which enables the headset 300 to communicate over commercially available headset signaling. The headset can optionally include a second ear piece 340 and a second signaling button 350. A microphone 325 can also be mounted on the support 310, in which the user can communicate with other users or systems or provide voice commands to a mobile terminal. The microphone 325 can be an electret microphone, or any other suitable microphone. Controls for the headset, such as volume, can be located on the headset itself as well as on the mobile terminal. Additionally, the headset and/or the mobile terminal can include communication ports (not shown) to allow the headset to receive data from other non-remote sources, such as a peripheral device. The headset can also include status indicator lights (not shown) provided on the exterior of the housing for visually displaying the system state during system operation Although the headsets in FIGS. 2 and 3 have been illustrated as an over the head band design to be worn on a user's head for positioning a pair of speakers adjacent to each of the user's ears, it is to be appreciated that the headset can be of any suitable design and is contemplated as falling within the scope of the present invention. For instance, the headset can also be designed such that it is worn around a single outer ear of the use for positioning a single earphone against one of the user's ears.

Figure 4:
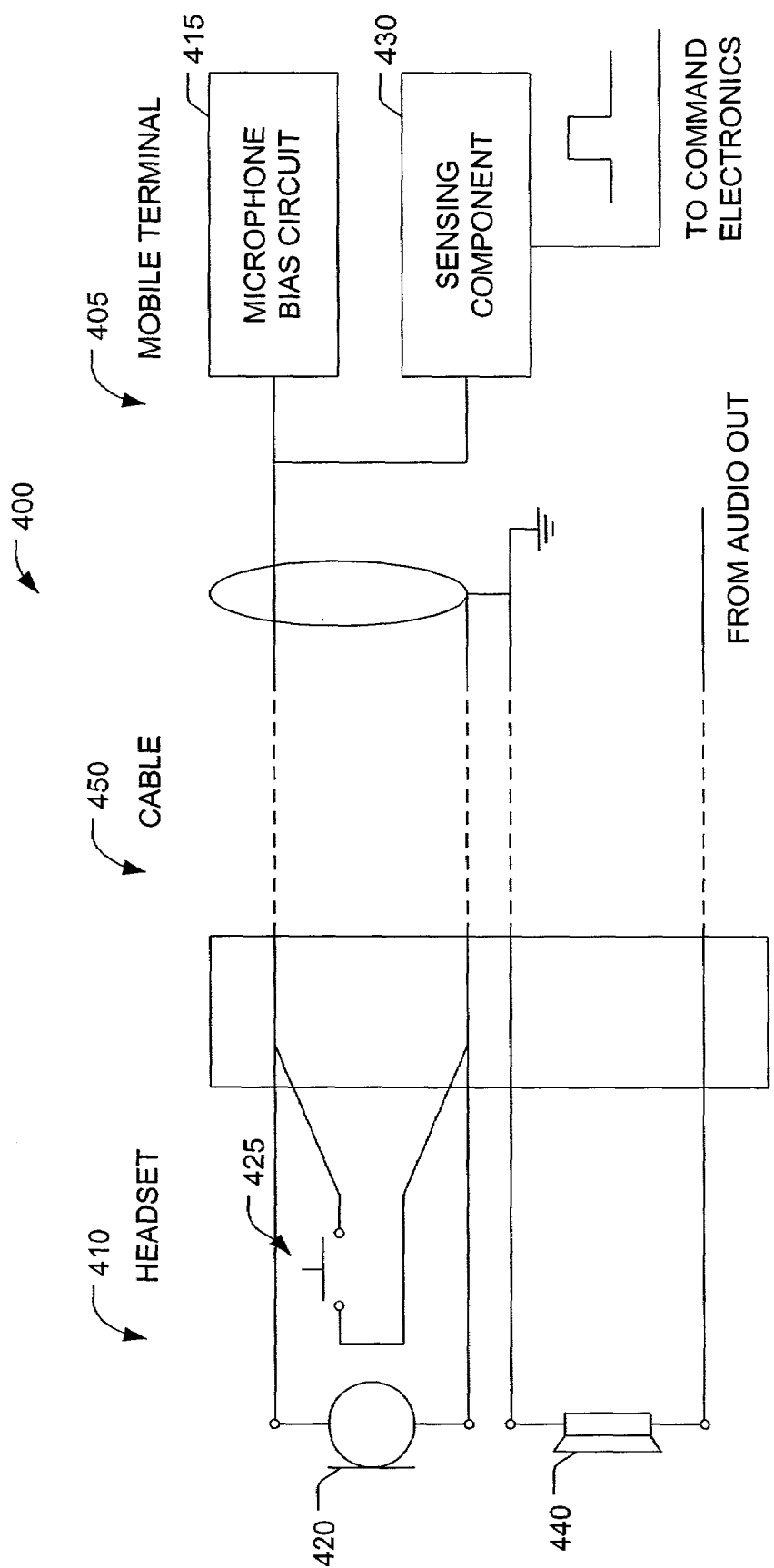
FIG. 4 is a circuit diagram for a mobile terminal to detect signaling from a push-button enabled headset in accordance with an aspect of the present invention.

Turning now to FIG. 4, a system 400 for a mobile terminal 405 employing a push-button enabled type headset 410 is depicted. Switch activation is utilized to momentarily short a microphone bias circuit 415. The microphone bias circuit 415 provides bias current for a microphone 420 of the headset 410. The headset 410 includes a bias voltage, generally above 2V DC, for the microphone 420. A push button 425 connected in parallel with the microphone 420 will bring the voltage to about 0V when depressed. A sensing component 430 located in the terminal 405 detects the voltage change and interprets such voltage change as an activation of the button 425 on the headset 410. The sensing component 430 can be a voltage change sense circuit, for example. The terminal 405 monitors the microphone bias voltage and performs a context dependent function upon the sense of bias level change. The sensing component 430 can be implemented as a comparator whose input is connected to the bias voltage that outputs a digital level, which is further monitored by digital circuitry.

The headset 410 also includes a speaker component 440 for receiving audio from the terminal 405 and/or a remote source. Circuitry within the mobile terminal 405 can be connected to circuitry of the headset 410 via a cable 450. Alternatively, the headset can wirelessly communicate with the mobile terminal, as will be explained in further detail below.

As described above, several different commands can be implemented as a function of how the button is depressed (e.g., duration, multiple repeated pushes). If the momentary closure of the button is shorter than a predetermined minimum, the closure is determined to be accidental and is therefore ignored. In this manner, the terminal performs a switch debouncing function.

In view of the foregoing structural and functional features described above, methodologies in accordance with various aspects of the present invention will be better appreciated with reference to FIGS. 5–8. While, for purposes of simplicity of explanation, the methodologies of FIGS. 5–8 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

Figure 5:
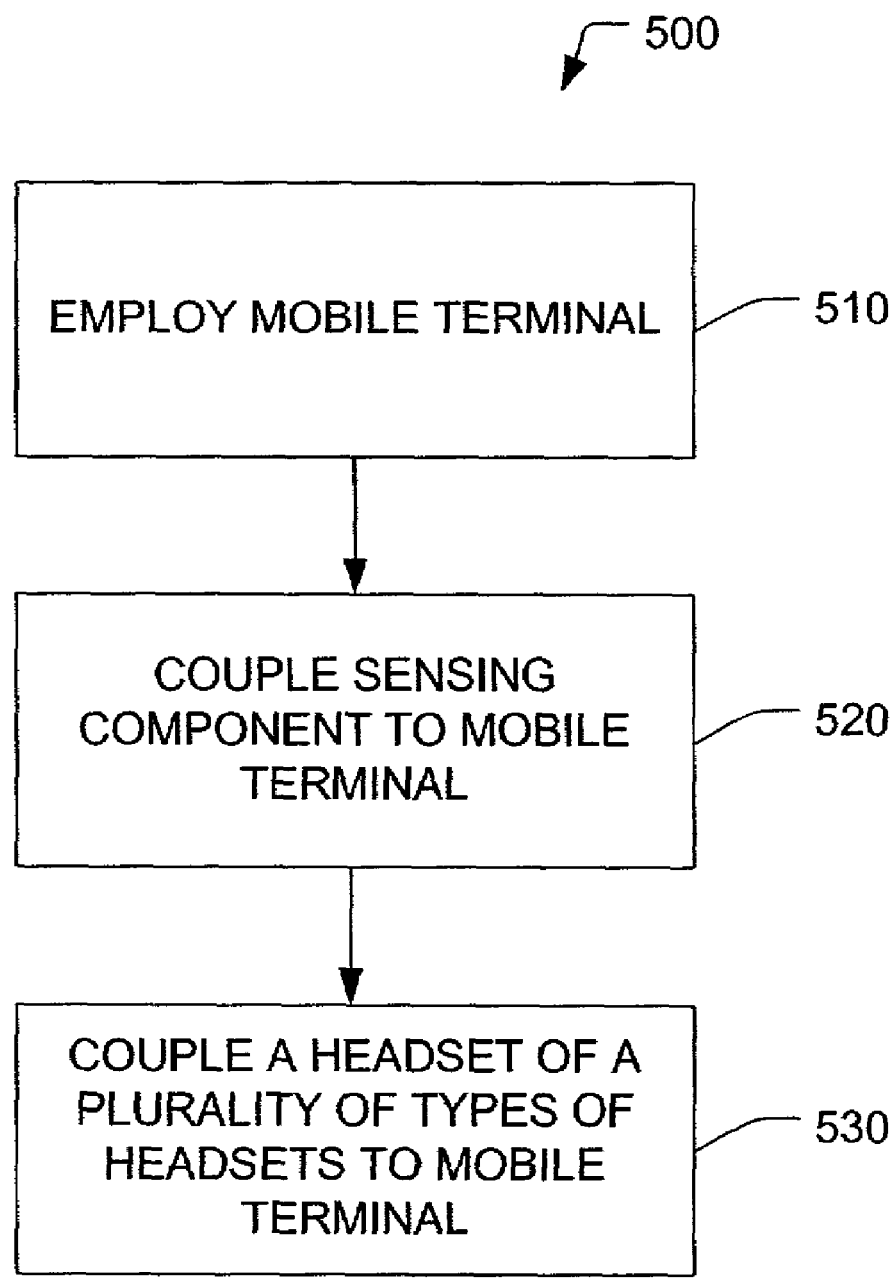
FIG. 5 is a flow diagram of a methodology for fabricating a mobile terminal in accordance with an aspect of the present invention.

FIG. 5 illustrates a methodology 500 for fabricating a mobile terminal in accordance with an aspect of the invention. The methodology begins at 510 where a mobile terminal is employed. It is to be appreciated that the mobile terminal can be a cellular telephone, a Personal Digital Assistant (PDA), or any other mobile computing/communications device that can be similarly employed. At 520, a sensing component is coupled to the mobile terminal. The sensing component is employed to facilitate detection of headset signaling. At 530, a headset is coupled to the terminal. The mobile terminal can interoperate with a plurality of types of headsets. For example, the headset can be push-button enabled headset which includes a signaling mechanism, such as a button, to issue commands to the mobile terminal. Alternatively, the headset can be a standard, commercially available headset without a signaling mechanism.

Figure 6:
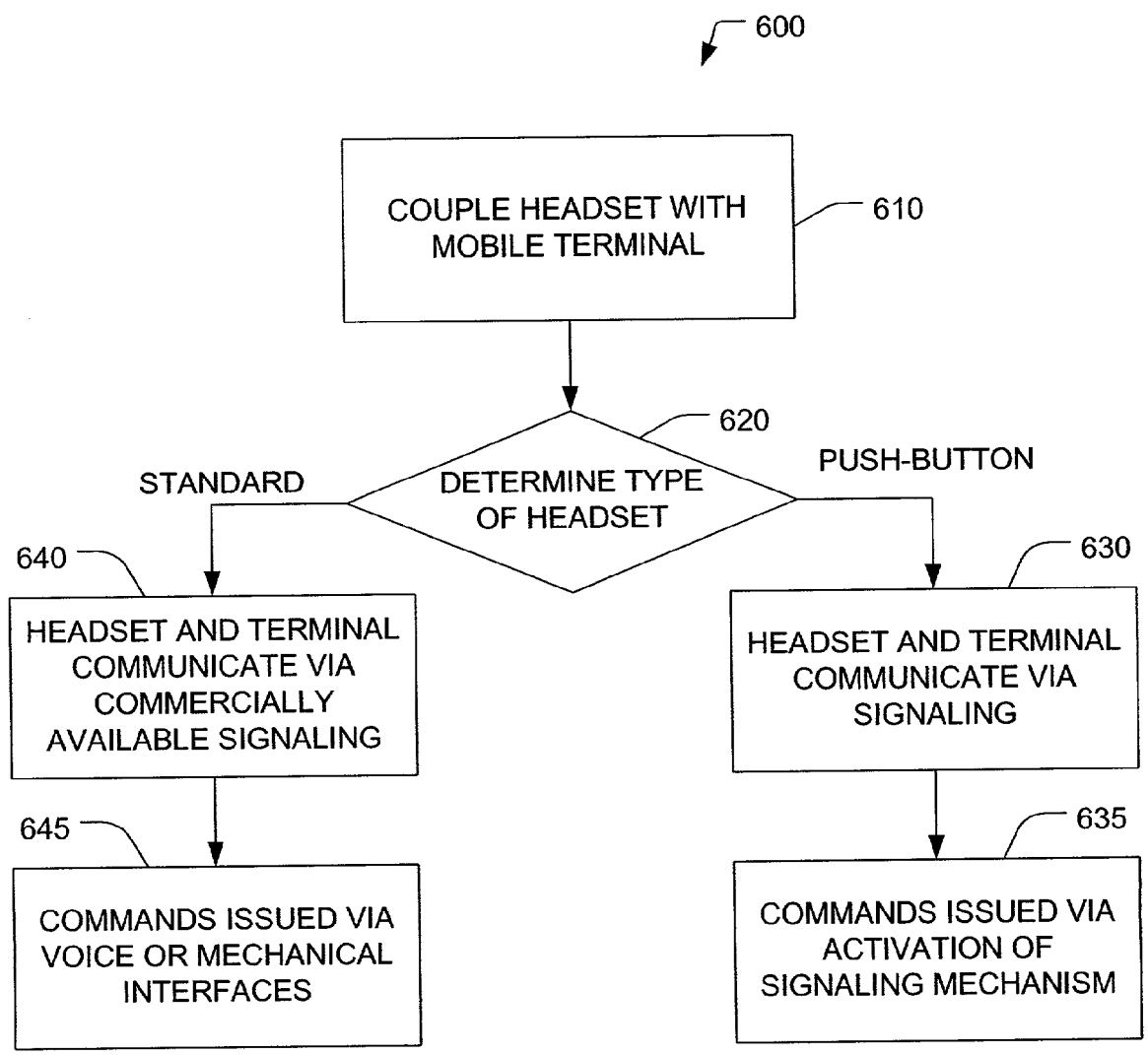
FIG. 6 is a flow diagram of a methodology for employing a mobile terminal with a headset in accordance with an aspect of the present invention.

FIG. 6 illustrates a methodology 600 for facilitating communication between a mobile terminal and a headset. At 610, the methodology begins by coupling a headset with a mobile terminal. At 620, it is determined what type of headset is coupled to the mobile terminal. For example, the headset can be a push-button enabled headset or a standard, commercially available headset. If a push-button enabled headset is coupled to the terminal, the method proceeds to 630 where communication between the mobile terminal and the headset occurs via a signaling mechanism coupled with the headset. Then, at 635, commands are issued to the mobile terminal by activation of the signaling mechanism (e.g., button) on the headset. However, if at 620, it is determined that the headset is standard, the method proceeds to 640 where the headset and mobile terminal communicate over commercially available headset signaling. At 645, commands are issued to the mobile terminal via voice recognition methods or mechanical interfaces on the mobile terminal.

Figure 7:
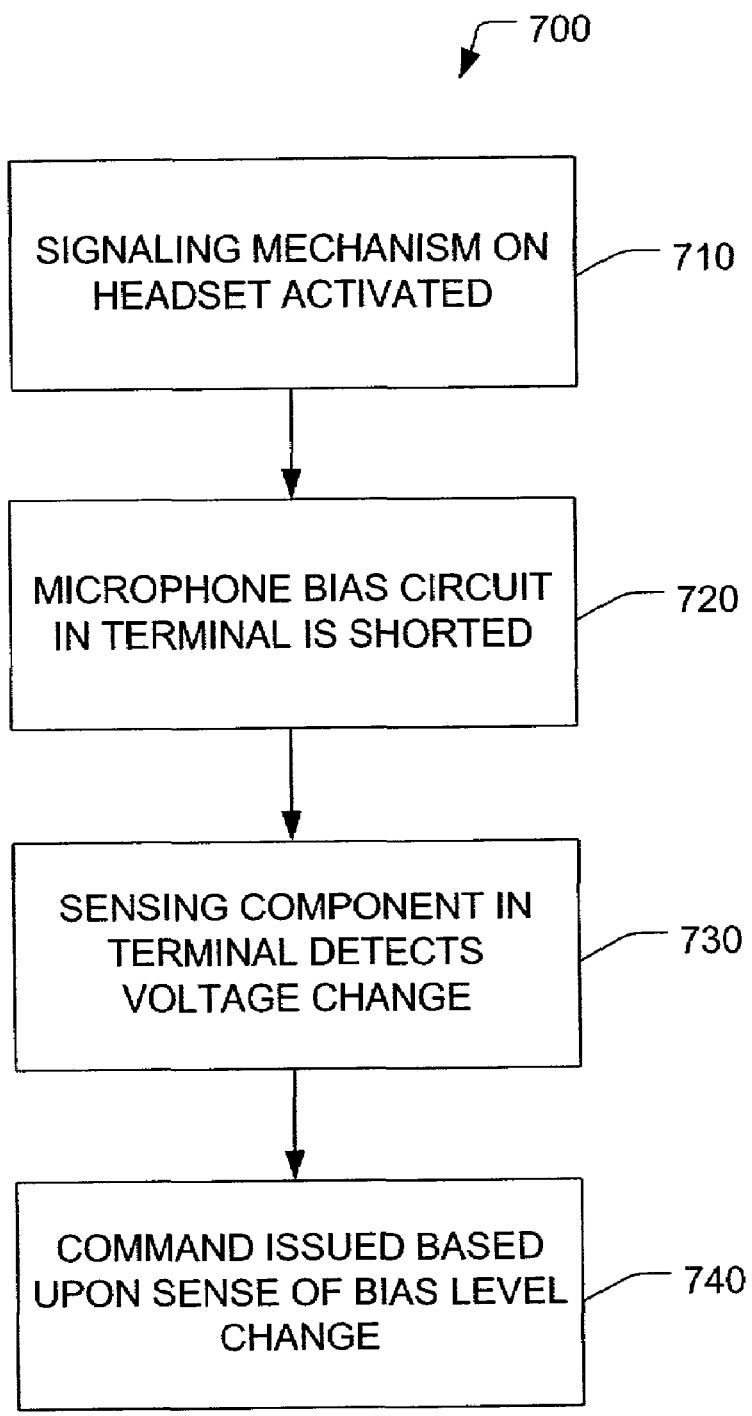
FIG. 7 is a flow diagram of a high level operation of headset signaling in accordance with an aspect of the present invention.

Turning now to FIG. 7, a methodology 700 for a high level operation of push-button enabled headset signaling is depicted in accordance with an aspect of the present invention. The methodology begins at 710 where a button located on a headset is activated to provide signaling to a mobile terminal. Activation of the button leads to a short in a microphone bias circuit in the mobile terminal at 720. Then, at 730, a sensing component on the mobile terminal detects a voltage change, which is interpreted as an activation of the button. At 740, a command is issued to the mobile terminal based on the sense of bias level change. The command may be context sensitive, in which the command issued is dependent on the running application.

Figure 8:
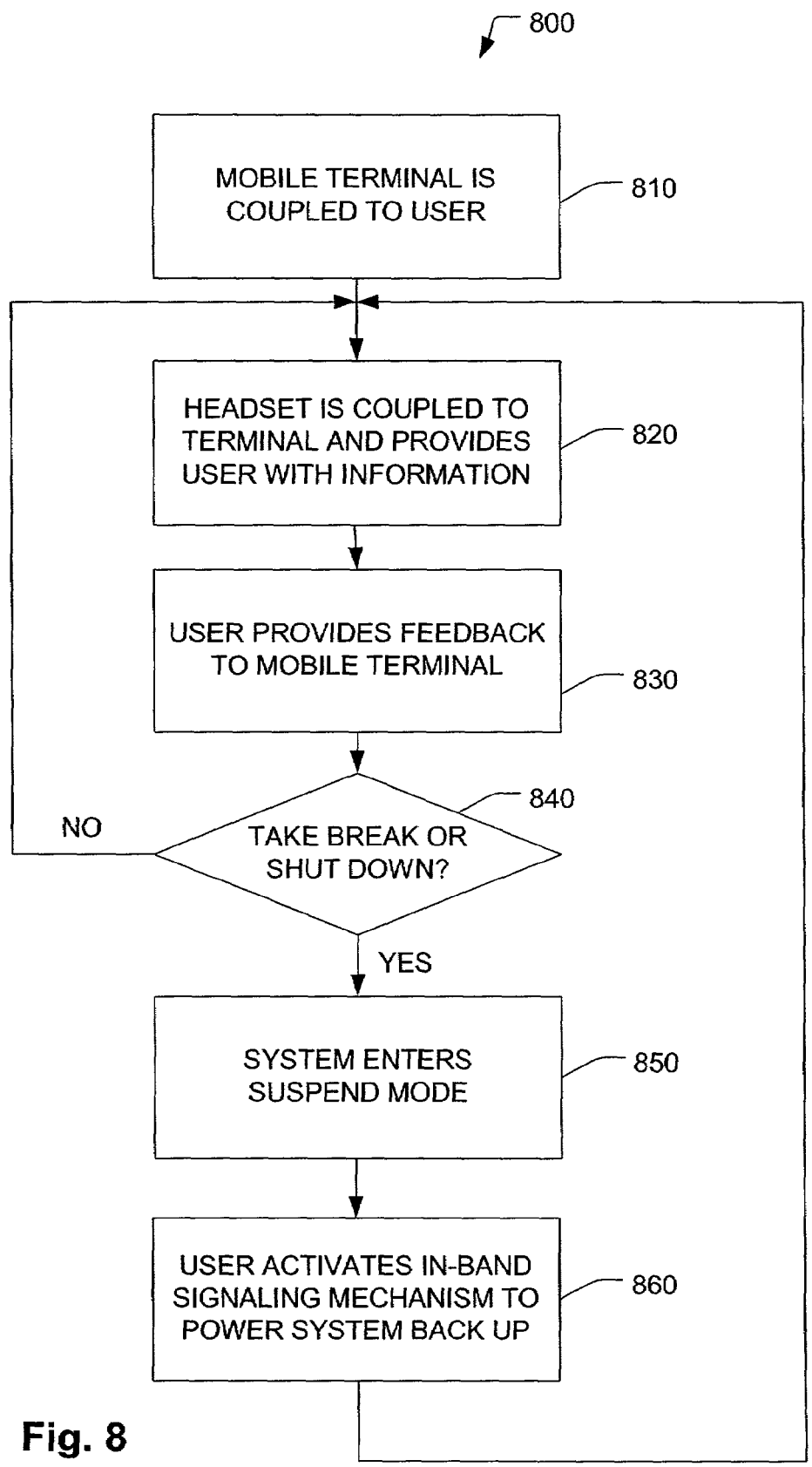
FIG. 8 is a flow diagram of an exemplary application of push-button enabled headset in accordance with an aspect of the present invention.

FIG. 8 illustrates a methodology 800 for employing a mobile terminal in a freezer picking application where a user picks food items from a freezer. At 810, the user wears a mobile terminal device on a belt under several layers of clothing. At 820, a headset is connected to the terminal, wirelessly or via a cable, and provides the user with information regarding which items to pick and where such items can be located. At 830, the user inputs what has been picked and that he/she is ready to go on to the next item. At 840, the user determines whether he/she would like to take a break or shut down. If yes, at 850, to extend battery life, the system shuts down or enters into suspend mode, disabling speech input. When the user is finished with his/her break, at 860, the user activates a button on the headset to power it back up. The button allows the user to simply tap the inline switch and eliminates the need for the user to reach to the mobile terminal. The method then returns to 820 where the user is provided with information regarding which items to pick and where such items can be located. The methodology also returns to 820 if, at 840, the user determines that he/she does not wish to take a break or shut down.

Figure 9:
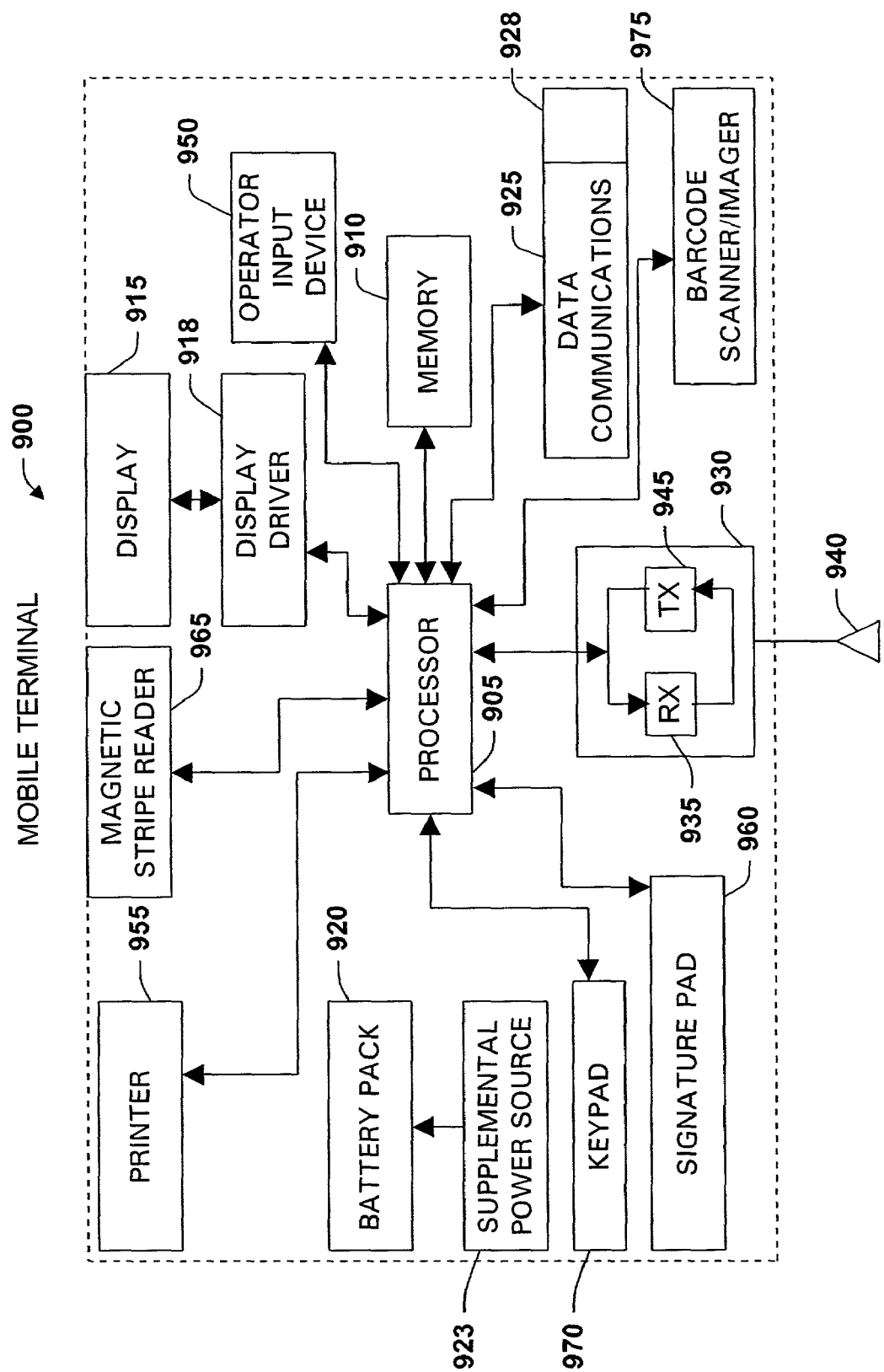
FIG. 9 is a schematic illustration of an exemplary communication device in accordance with the present invention.

Turning now to FIG. 9, a schematic representation according to one aspect of the present invention is shown in which a processor 905 is responsible for controlling the general operation of a mobile terminal 900. The processor 905 is programmed to control and operate the various components within the terminal 900 in order to carry out the various functions described herein. The processor or CPU 905 can be any of a plurality of suitable processors or micro controllers. For example, a processor such as Intel's 8 bit microcontrollers, the 8031, 8051 or 8052, can be utilized. The manner in which the processor 905 can be programmed to carry out the functions relating to the present invention will be readily apparent to those having ordinary skill in the art based on the description provided herein.

A memory 910 tied to the processor 905 is also included in the mobile terminal 900 and serves to store program code executed by the processor 905 for carrying out operating functions of the mobile terminal 900 as described herein. The memory 910 also serves as a storage medium for temporarily storing information such as receipt transaction information and the like. The memory 910 is adapted to store a complete set of the information to be displayed. According to a preferred embodiment, the memory 910 has sufficient capacity to store multiple sets of information, and the processor 905 could include a program for alternating or cycling between various sets of display information.

A display 915 is coupled to the processor 905 via a display driver system 918. The display 915 may be a liquid crystal display (LCD) or the like. The display 915 is operable to display data or other information relating to ordinary operation of the mobile terminal 900. For example, the display 915 may display a set of customer information, which is displayed to the operator and may be transmitted over a system backbone (not shown). Additionally, the display 915 may display a variety of functions that control the execution of the mobile terminal 900. The display 915 is capable of displaying both alphanumeric and graphical characters. Furthermore, the display 915 may be a touch screen, able to receive user information as well as display information.

Power is provided to the processor 905 and other components forming the terminal 900 by a battery pack 920. In the event that the battery pack 920 fails or becomes disconnected from the mobile terminal 900, a supplemental power source 923 provides power to the processor 905, the supplemental power source 923 can be a super capacitor connected electrically in parallel with the battery 920. The mobile terminal 900 may enter a minimum current draw of sleep mode upon detection of a battery failure.

The mobile terminal 900 includes a communication subsystem 925 that includes a data communication port 928, which is employed to interface the processor 905 with a remote system. The mobile terminal 900 also optionally includes an RF section 930 connected to the processor 905. The RF section 930 includes an RF receiver 935, which receives RF transmissions from the remote system for example via an antenna 940 and demodulates the signal to obtain digital information modulated therein. The RF section 930 also includes an RF transmitter 945 for transmitting information to the remote system, for example, in response to an operator input at keypad 950 or the completion of a transaction. Peripheral devices, such as a printer 955, signature pad 960, magnetic stripe reader 965, touch panel 970, and barcode scanner 975 can also be coupled to the mobile terminal through the processor 905.

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

What is claimed is:

1. A mobile terminal, comprising:
 a housing; and
 a sensing component, retained within the housing, that detects signaling from a headset of a plurality of types of headsets that the mobile terminal is intended to operate with;
 a signaling mechanism, employed by the headset, that issues commands to the sensing component using predetermined sequences of switch activations including a plurality of durations and periodic pulses, the mobile terminal performing tasks upon the commands effected by the signaling mechanism.

2. The mobile terminal of claim 1, the plurality of types of headsets that the mobile terminal is intended to operate with includes a push-button enabled headset.

3. The mobile terminal of claim 1, the sensing component comprising a voltage change sense circuit for sensing voltage changes in the headset.

4. The mobile terminal of claim 1, the sensing component further comprising a condenser for providing a digital level of a voltage of the headset.

5. The mobile terminal of claim 1, further comprising at least one of a bar code scanner, a magnetic stripe reader, and a signature pad, operatively connected to the sensing component.

6. A signaling system, comprising:
 a headset employing a signaling mechanism comprising a switch activation scheme to issue commands in accordance with predetermined sequences of switch activations having a plurality of switch activation durations and periodic pulses; and a mobile terminal coupled to the headset, the mobile terminal having a sensing component for detecting commands from the signaling mechanism, the mobile terminal also being capable of interoperating with a headset.

7. The system of claim 6, the headset further comprising a microphone.

8. The system of claim 7, the signaling mechanism being connected in parallel with the microphone.

9. The system of claim 7, the mobile terminal comprising a microphone bias circuit for detecting changes in a bias voltage of the microphone.

10. The system of claim 7, the sensing component comprising a condenser monitored by digital circuitry, an input of the condenser being connected to a bias voltage of the microphone.

11. The system of claim 6, the sensing component being a voltage change sense circuit to detect voltage changes in the headset caused by the activation of the signaling mechanism.

12. The system of claim 11, the voltage change sense circuit connected to a microphone bias circuit for detecting a bias level change in the headset, the bias level change being caused by activation of the signaling mechanism.

13. The system of claim 6, the headset and the mobile terminal being coupled via a cable.

14. The system of claim 6, the headset and the mobile terminal being coupled wirelessly.

15. The system of claim 6, the signaling mechanism being a push button.

16. The system of claim 6, the signaling mechanism being a switch.

17. The system of claim 6, the mobile terminal being capable of interoperating with both the headset having the signaling mechanism and an audio headset.

18. A method for fabricating a mobile terminal, comprising:
   employing a mobile terminal that issues commands in accordance with a switch activation scheme that includes a plurality of switch activation duration and periodic pulses; and
   coupling a sensing component to the mobile terminal, such that the sensing component can detect commands based on signaling from a headset.

19. The method of claim 18, the sensing component detecting signaling via a push-button if the headset is a push-button enabled type headset.

20. The method of claim 18, the sensing component detecting signaling via voice or via mechanical interfaces on the mobile terminal if the headset is a standard type headset.

21. The method of claim 18, further comprising, connecting the sensing component in parallel to a microphone bias circuit, such that the sensing component detects a bias level change in the headset, the bias level change being caused by activation of a signaling mechanism coupled to the headset.

22. The method of claim 18, further comprising, coupling a condenser monitored by digital circuitry to a bias voltage of a microphone.

23. A method for fabricating a mobile terminal headset comprising:
   coupling a switch signaling mechanism to the headset for issuing commands to a mobile terminal by generating a short across a microphone to ground therefore effecting a level chance in bias voltage of the mobile terminal; and
   the level chance and coupling a component to the signaling mechanism that senses interprets it as a command.

24. The method of claim 23, the switch signaling mechanism being a push-button.

25. A signaling system, comprising:
   a headset having means for providing signaling in accordance with predetermined sequences of switch activation durations and periodic pulses; and
   a mobile terminal coupled to the headset, the mobile terminal having sensing means for sensing commands produced by the headset signaling.

* * * * *

UNITED STATES PATENT AND TRADEMARK OFFICE
CERTIFICATE OF CORRECTION

PATENT NO.        : 7,110,799 B1                               Page 1 of 1
APPLICATION NO.   : 10/172334
DATED             : September 19, 2006
INVENTOR(S)       : Bruce A. Willins et al.

It is certified that error appears in the above-identified patent and that said Letters Patent is hereby corrected as shown below:

Column 10, Line 23 (Claim 23, line 6):
Please change "chance" to -- change --

Column 10, Line 25 (Claim 23, line 8):
Please change "chance" to -- change --

Signed and Sealed this

Twelfth Day of December, 2006

JON W. DUDAS
*Director of the United States Patent and Trademark Office*